United States Patent [19]

Ikekawa et al.

[11] 3,868,396

[45] Feb. 25, 1975

[54] PREPARATION OF 25-HYDROXYCHOLESTEROL AND ESTERS THEREOF

[75] Inventors: Nobuo Ikekawa; Masuo Morisaki; Julieta Rubio Lightbourn, all of Tokyo, Japan

[73] Assignee: Eisai Co., Ltd., Tokyo, Japan

[22] Filed: Feb. 12, 1974

[21] Appl. No.: 441,830

[30] Foreign Application Priority Data

Feb. 16, 1973 Japan.............................. 48-18305

[52] U.S. Cl. ............................................. 260/397.2
[51] Int. Cl. .................. C07c 169/60, C07c 167/20
[58] Field of Search .................................. 260/397.2

[56] References Cited
UNITED STATES PATENTS
3,822,254   7/1974   Patride, Jr................. 260/239.55 R Primary Examiner—Elbert L. Roberts
Attorney, Agent, or Firm—Wenderoth, Lind & Ponack

[57] ABSTRACT

New process for the preparation of 25-hydroxycholesterol and 3-ester thereof by the reaction of desmosterol or 3-ester thereof with a mercuric salt. The product is then decomposed with an alkali metal borohydride. The contemplated 25-hydroxychloresterol and 3-ester thereof may easily be converted into the active form of vitamin $D_3$. the new process gives 25-hydroxychloresterol and ester thereof with good yield.

6 Claims, No Drawings

PREPARATION OF 25-HYDROXYCHOLESTEROL AND ESTERS THEREOF

This invention relates to a new and novel process for the production of 25-hydroxycholesterol and 3-ester thereof. More particularly, the present invention is directed to a new process for the preparation of 25-hydroxycholesterol and 3-ester thereof, which comprises reacting desmosterol or its 3-ester with a mercuric salt of organic or inorganic acid and reducing the resulting reaction product with an alkali metal borohydride.

25-Hydroxycholesterol and 3-ester thereof are convertible into 25-hydroxycholecalciferol by the following conventional sequence:

1. allylic bromination affording 7-bromo compound;
2. dehydrobromination to give 7-dehydro compound; and
3. ultraviolet irradiation.

25-Hydroxycholecalciferol has recently been paid an attention as "active vitamin $D_3$". Accordingly, 25-hydroxy-cholesterol and its 3-esters are the valuable intermediates for the commercial production of active vitamin $D_3$.

As for the production of 25-hydroxycholesterol, there are two methods reported by A. I. Ryer et al in J. Am. Chem. Soc., 72, 4247 (1950), and by W. G. Dauben et al in J. Am. Chem. Soc., 72, 4248 (1950). According to the A. I. Ryer's method, 25-hydroxycholesterol is obtained by the reaction of methyl magnesium iodide with 3β-acetoxy-5-cholestene-25-one, i.e., norcholestenol-25-one acetate, while the W. G. Dauben method is almost the same as the former one, with exception that 3β-hydroxy-5-cholestene-25-one, i.e., norcholestenol-25-one, is used as starting material.

Norcholestenol-25-one used in the above known methods may be obtained by oxidation of cholesterol. However, in the oxidation of cholesterol, there are simultaneously formed various oxidation products in addition to the contemplated norcholestenol 25-one. Consequently, the method necessitates troublesome steps for the isolation and purification of norcholestenol-25-one from such undesirable by-products and the yield of norcholestenol-25-one is considerably low. It must be said therefore that the methods in which norcholestenol-25-one or its ester is used as starting material are not adaptable for the commercial production of 25-hydroxycholesterol.

The object of this invention is to provide a novel process suitable for the commercial production of 25-hydroxycholesterol and its 3-ester at a high yield with easy working steps starting from desmosterol and its 3-ester.

Desmosterol and its 3-esters used as the starting materials of the present invention can readily be obtained with a high yield by reacting stannic chloride on fucosterol-24(28)-epoxide or its 3-ester according to the method disclosed by the present inventors in the specification of a co-pending U.S. application Ser. No. 362,506, filed on May 21, 1973. Fucosterol-24(28)-epoxide or its 3-esters are obtainable with ease and at a high yield by treating fucosterol or its 3-ester with an organic peracid. Fucosterol is present plentifully in various sea-weeds belonging to brown algae, such as, Sargassum ringgoldianum, Sargassum Confusum, Fucus evanescens, Pelvetia wrightii, and Dictyopteris divaricata, etc., and can easily be isolated therefrom by extraction. Desmosterol and its 3-ester thus obtained are the valuable intermediates for the commercial production of 25-hydroxy-cholesterol and its 3-esters and therefore of active vitamin $D_3$.

The reaction procedures used in the present invention may schematically be shown by the followings:

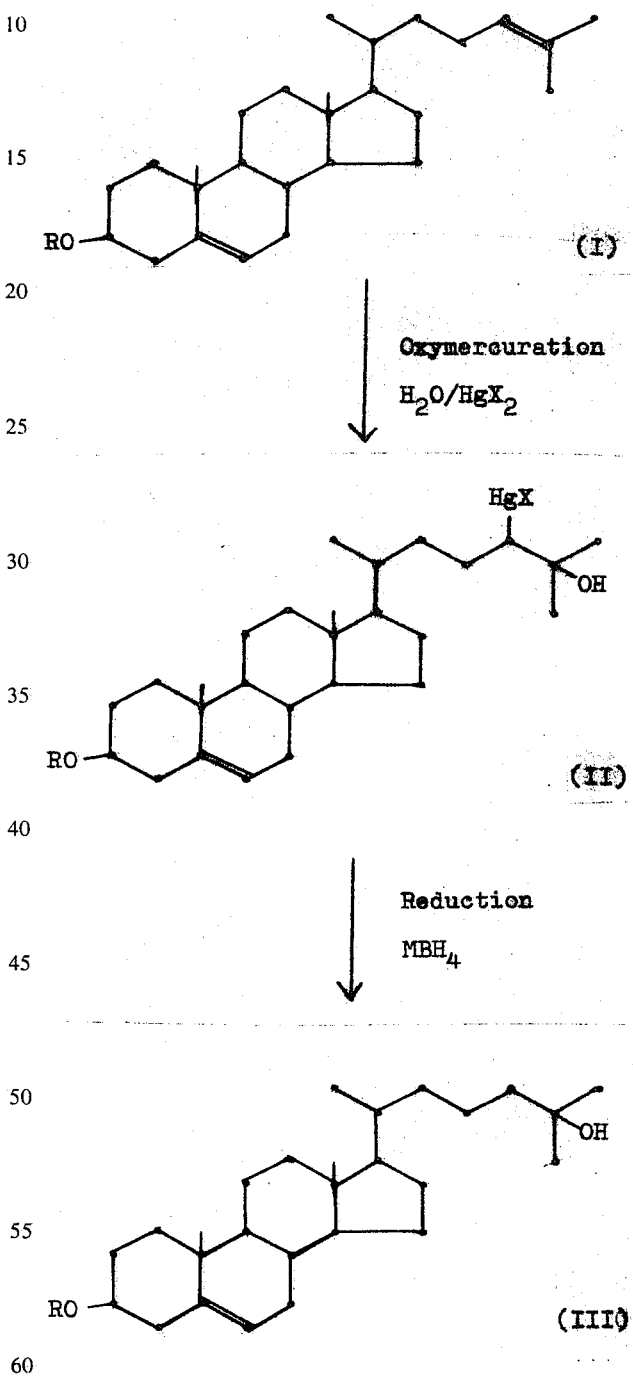

In the above formulae, R is hydrogen atom or an alkanoyl or aroyl; X is an acid radical; and M is an alkali metal.

In an embodiment of this invention, desmosterol or 3-esters thereof represented by the above formula (I) is first reacted with a mercuric salt or organic or inorganic acid to obtain the compound of the formula (II).

The representative 3-esters include acetate, propionate, butylate, benzoate and the like. As suitable mercuric salt ($HgX_2$), there may be mentioned the inorganic mercuric salts such as mercuric bromide, chloride and nitrate, as well as the organic mercuric salts such as mercuric acetate, trifluoroacetate and the like.

The reaction is conducted under cooling in a mixed solvent consisting of water and a water-missible organic solvent capable of dissolving the compound of the formula (I). Particularly preferable solvent system is a mixture of water and tetrahydrofuran. During the reaction, the mercuric salt employed attacks exclusively the double bond at the 24-position, but not the double bond at the 5-position of steroid nucleus, affording the intermediate of the formula (II). The intermediate may immediately be utilized for the subsequent reduction step without isolation.

The reduction of the intermediate compound of the formula (II) is carried out by adding alkali metal borohydride such as sodium borohydride or potassium borohydride to the reaction mixture of oxymercuration under alkaline condition.

The reaction is completed within a considerably short period to give 25-hydroxycholesterol or its 3-ester of the formula (III), the purposed compound of the present invention.

Isolation and purification of the product can be effected with ease by the conventional manner such as extraction, recrystallization, chromatography and the like.

The invention will be further illustrated by the following Examples.

EXAMPLE 1

100 mg. of desmosterol acetate and 122 mg. of mercuric bromide were added to a mixture of 0.3 ml. of water and 0.9 ml. of tetrahydrofuran. The resulting aqueous suspension was stirred for 3 hours under ice-cooling at about 0°C., and then 4 hours at room temperature. The reaction mixture was made alkaline with addition of 2.5 ml. of aqueous 3N sodium hydroxide. 0.41 g. of sodium borohydride were then added to the alkaline solution and the mixture was stirred at room temperature for 1 hour. The reaction mixture was extracted with ether, and the etheral extract was washed with water, dried on anhydrous sodium sulfate, filtered and distilled to remove the solvent. The resulting solid product was recrystallized from a mixture of ethanol and water to obtain 90 mg. of 25-hydroxycholestserol acetate amounting to 86.4% of the theoretical yield.

EXAMPLE 2

0.5 g. of desmosterol acetate and 350 mg. of mercuric acetate were added to a mixture of 1.5 ml. of water and 4.5 ml. of tetrahydrofuran. The resulting aqueous suspension was stirred for 3 hours under ice-cooling at about 0°C. and then 4 hours at room temperature. To the reaction mixture, there were added 10 ml. of 3N sodium hydroxide and then 2.1 g. of sodium borohydride. The mixture was stirred for 1 hour at room temperature. After completion of the reaction, the reaction mixture was extracted with ether, and the etheral extract was washed with water, dried on anhydrous sodium sulfate, filtered and distilled to remove the solvent. The solid reaction product thus obtained was recrystallized from a mixture of water and ethanol to obtain 0.43 g. of 25-hydroxycholesterol acetate which amounts to 82.25% of the theoretical yield.

EXAMPLE 3

100 mg. of desmosterol and 115 mg. of mercuric nitrate were added to a mixture of 0.3 ml. of water and 0.9 ml. of tetrahydrofuran. The resulting aqueous suspension was stirred for 3 hours under ice-cooling at about 0°C. and then 4 hours at room temperature. The reaction mixture was made alkaline by the addition of 2.5 ml. of aqueous 3N sodium hydroxide solution. To the alkaline solution, there were added 0.41 g. of sodium borohydride and the mixture was stirred at room temperature for 1 hour. The reaction mixture was then extracted with ether, and the etheral extract was washed with water, dried on anhydrous sodium sulfate, filtered and distilled to remove the solvent. The resulting solid product was recrystallized from a mixture of ethanol and water to obtain 75 mg. of 25-hydroxycholesterol, which amounts to 71.5% of the theoretical yield.

What is claimed is:

1. A process for the preparation of 25-hydroxycholesterol and 3-esters thereof, comprising reacting desmosterol or 3-ester thereof with a mercuric salt of organic or inorganic acid and reducing the resulting reaction product with an alkali metal borohydride.

2. A process as claimed in claim 1, wherein the 3-ester of desmosterol is one selected from the group consisting of desmosterol 3-acetate, 3-propionate, 3-butylate and 3-benzoate.

3. A process as claimed in claim 1, wherein an organic or inorganic mercuric salt employed is selected from the group consisting of mercuric acetate, trifluoroacetate, bromide and nitrate.

4. A process as claimed in claim 1, wherein the alkali metal borohydride employed as the reducing agent is sodium or potassium borohydride.

5. A process as claimed in claim 1, wherein the reaction is conducted in a mixture consisting of water and a water-missible organic solvent which is capable of dissolving desmosterol of 3-ester thereof.

6. A process as claimed in claim 5, wherein the water-missible organic solvent is tetrahydrofuran.

* * * * *